United States Patent
Ren et al.

(10) Patent No.: US 10,574,108 B2
(45) Date of Patent: Feb. 25, 2020

(54) DISTRIBUTED WINDING RADIAL GAP-TYPE MOTOR AND WINDING ARRANGEMENT METHOD THEREFOR

(71) Applicant: FANUC CORPORATION, Yamanashi (JP)

(72) Inventors: Gang Ren, Yamanashi (JP); Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 401 days.

(21) Appl. No.: 15/043,736

(22) Filed: Feb. 15, 2016

(65) Prior Publication Data

US 2016/0241099 A1   Aug. 18, 2016

(30) Foreign Application Priority Data

Feb. 17, 2015   (JP) .................................. 2015-028637

(51) Int. Cl.
*H02K 3/28* (2006.01)
*H02K 15/04* (2006.01)
*H02K 15/06* (2006.01)
*H02K 15/00* (2006.01)

(52) U.S. Cl.
CPC ............ *H02K 3/28* (2013.01); *H02K 15/0068* (2013.01); *H02K 15/0435* (2013.01); *H02K 15/068* (2013.01)

(58) Field of Classification Search
CPC ............... H02K 3/12; H02K 3/32; H02K 3/28
(Continued)

(56) References Cited

U.S. PATENT DOCUMENTS

| | | | |
|---|---|---|---|
| 6,170,974 B1 | 1/2001 | Hyypio | |
| 2005/0194857 A1* | 9/2005 | Mori | H02K 3/12 310/201 |
| 2013/0147306 A1* | 6/2013 | Trammell | H02K 3/50 310/215 |
| 2015/0207374 A1* | 7/2015 | Tsuiki | H02K 3/12 310/202 |

FOREIGN PATENT DOCUMENTS

| | | |
|---|---|---|
| CN | 102782995 A | 11/2012 |
| EP | 2388895 A2 | 11/2011 |

(Continued)

OTHER PUBLICATIONS

Machine Translation, Hiroya , JP-2013258835-A, Dec. 2013. (Year: 2013).*

(Continued)

*Primary Examiner* — Thomas Truong
(74) *Attorney, Agent, or Firm* — Fredrikson & Byron, P.A.

(57) ABSTRACT

A winding arrangement method for a radial gap-type motor in which a three phase winding wound in a distributed winding form is inserted in slots of a stator includes: a coil forming step that, for each phase, forms a coil wound for each one pole pair; a coil group forming step that, for each phase, forms a first coil group by connecting odd-number-th coils along a direction of rotation via crossover wires, and forms a second coil group by connecting even-number-th coils along the direction of rotation via crossover wires; and a parallel-connecting step that, for each phase, connects the first coil group and the second coil group at one end, to form a current input side lead wire at the connection point, and connects the first coil group and the second coil group at the other end, to form a neutral point at the connection point.

3 Claims, 18 Drawing Sheets

(58) Field of Classification Search
USPC .................. 310/178, 179, 180, 184, 195
See application file for complete search history.

(56) References Cited

FOREIGN PATENT DOCUMENTS

| JP | 4265645 | A | | 9/1992 | |
|----|---------|---|---|--------|---|
| JP | 1169737 | A | | 3/1999 | |
| JP | 2003153514 | A | | 5/2003 | |
| JP | 2011177012 | A | | 9/2011 | |
| JP | 2011205876 | A | | 10/2011 | |
| JP | 2013258835 | A | * | 12/2013 | |
| JP | 2013258835 | A | | 12/2013 | |
| JP | WO 2014017361 | A1 | * | 1/2014 | ............... H02K 3/12 |

OTHER PUBLICATIONS

Untranslated Decision to Grant a Patent mailed by Japan Patent Office (JPO) for Application No. JP 2015-028637 dated Oct. 3, 2017, 3 pages.
English machine translation of Decision to Grant a Patent mailed by Japan Patent Office (JPO) for Application No. JP 2015-028637 dated Oct. 3, 2017, 3 pages.
Untranslated Notification of Reasons for Refusal mailed by Japan Patent Office (JPO) for Application No. JP 2015-028637 dated Mar. 7, 2017, 3 pages.
English machine translation of Notification of Reasons for Refusal mailed by Japan Patent Office (JPO) for Application No. JP 2015-028637 dated Mar. 7, 2017, 3 pages.
English Abstract for Japanese Publication No. JPH04-265645 A, published Sep. 21, 1992, 2 pgs.
English Abstract and Machine Translation for Japanese Publication No. 2013-258835 A, published Dec. 26, 2013, 22 pgs.
English Abstract and Machine Translation for Japanese Publication No. 2011-205876 A, published Oct. 13, 2011, 57 pgs.
English Abstract and Machine Translation for Japanese Publication No. 2011-177012 A, published Sep. 8, 2011, 35 pgs.
English Abstract and Machine Translation for Japanese Publication No. 2003-153514 A, published May 23, 2003, 14 pgs.
English Abstract and Machine Translation for Japanese Publication No. 11-069737 A, published Mar. 9, 1999, 9 pgs.
English Abstract and Machine Translation for Chinese Publication No. 102782995 A, published Nov. 14, 2012, 32 pages.

* cited by examiner

DISTRIBUTED WINDING RADIAL GAP-TYPE MOTOR AND WINDING ARRANGEMENT METHOD THEREFOR

BACKGROUND OF THE INVENTION

1. Field of the Invention

The present invention relates to a radial gap-type motor in which a three-phase winding wound in a distributed winding form is inserted in slots of a stator, and a winding arrangement method therefor.

2. Description of the Related Art

The winding arrangement for a three-phase motor may be largely classified into two types: concentrated winding and distributed winding.

The concentrated winding is such that coils are wound directly in slots and coil ends do not overlap adjacent coils so that it is possible to make small the coil ends.

In contrast, the distributed winding is such that coils for each phase are wound in a distributed manner onto slots. With the distributed winding, the coils for the three phases are inserted in the slots in a manner overlapping each other at the coil ends so that the coil ends become large. Due to the coil ends becoming large, the winding resistance is increased, which results in an increase in the copper loss when a current is caused to flow through the motor. In other words, the output of the motor in response to input power is decreased so that the efficiency of the motor is deteriorated.

Description will be made of a conventional distributed winding method for a three-phase radial gap-type motor hereinbelow. FIG. 9 is a perspective view illustrating blades to be used for distributed winding, and FIG. 10 is a fragmentary sectional view illustrating a positional relationship between blades and a stator core. For distributed winding, blades 51 (rods) are used which have a shape with an outer diameter slightly smaller than the inner diameter of a stator core 52 and a width substantially equal to the tooth tip of teeth 61 of the stator core 52. FIGS. 11 through 14 are views illustrating a conventionally used method of distributed winding for a radial gap-type motor. First, as illustrated in FIG. 11, coils 53, which are molded for each one pole pair, are engaged with the blades 51. When the coils 53 are sequentially engaged with the blades 51 to the extent of being inserted in the slots 55 at a time, a stator core 52 is set beyond the blades 51 with which the coils 53 are engaged as illustrated in FIG. 12, and then by inserting an insert rod 54 formed with projections each having a width substantially equal to that of the slot opening portion and an outer diameter substantially equal to the inner diameter of the stator core 52, the coils 53 are inserted in the slots 55 from the slot opening portion of the stator core 52. FIGS. 13 and 14 are sectional views when FIG. 12 is cut along the circumferential direction; of these views, FIG. 13 illustrates a state on the way of inserting the coil 53 in the slot 55 using the insert rod 54, while FIG. 14 illustrates a state in which the insertion of the coil 53 in the slot 55 is completed.

As a winding arrangement method of distributed winding, there is a method in which the winding for each of the three phases is inserted sequentially. FIG. 15 is a developed sectional view schematically illustrating an example of 8-pole-pair and 36-slot winding arrangement for a conventional distributed winding radial gap-type motor, and FIG. 16 is a cross-sectional view illustrating the 8-pole-pair and 36-slot winding arrangement for the radial gap-type motor illustrated in FIG. 15. In FIGS. 15 and 16, the respective slots S are assigned identification numerals 1 to 36 in column B along the direction of rotation of the motor.

Further in FIG. 15, the coils are represented by thick solid lines, the terminals of power source input side lead lines of the respective phases are represented by a "circle", and the neutral points of the respective phases are represented by a "square". Further, when the coils for the three phases are wound in the form of a two-layer winding with 8 pole-pairs and 36 slots, it follows that two same phase coils or two different phase coils, with one for each phase, are arranged, but in FIG. 15, for the sake of simplicity of the drawing, the coils for the three phases, which are arranged in the slots, are schematically represented in three rows corresponding to the respective phases. Further in FIG. 16, the representation of the sectional shape, per se, of the coils in the slots S is omitted; the coils of the respective phases in the slots are represented by characters "+U", "−U", "+V", "−V", "+W", and "−W"; and only the power source input side lead lines of the respective phases are represented by thick solid lines.

In this winding arrangement method, first for each of the three phases, for example, two large coils of 5-slot pitch and one small coil of 2-slot pitch are formed in a concentric form as one pole pair of coils. Further, at each phase, all the coils, which are molded for each one pole pair, are connected in series. Then, for the coils connected in series for each phase, the coils for U phase are first engaged with the blades, then the coils for V phase are engaged with the blades, and then the coils for W phase are engaged with the blades. Further, the coils are inserted in the stator core while being engaged with the blades. Thus, since it is a simple task that "for each phase, the coils molded for each one pole pair are sequentially engaged with the blades while all being connected in series to each other, and the resultant structure is inserted in the stator core", there is an advantage that automatic processing of the winding arrangement using a machine is facilitated. However, there is a tendency that at the coil ends the three-phase coils cross (overlap) each other in a complicated manner as illustrated in FIG. 16. Focusing attention on the V phase, for example, indicates that the lead wire from the −U phase coil and the lead wire from the +W phase coil are located between the lead wire from the +V phase coil and the lead wire from the −V phase coil, and the three phase coils are crossing each other. Therefore, the method for sequentially inserting the three-phase coils for each phase has a problem in that the coil ends become large.

The crossing of the coils at the coil ends such as described above can be improved to a certain degree by devising the way of connection between the coils for one coil pair as described hereinafter. FIG. 17 is a developed sectional view schematically illustrating a further example of an 8-pole-pair and 36-slot winding arrangement for the conventional distributed winding radial gap-type motor, and FIG. 18 is a cross-sectional view illustrating of the 8-pole-pair and 36-slot winding arrangement for the radial gap-type motor illustrated in FIG. 17. In FIGS. 17 and 18, the respective slots are assigned identification numbers 1 to 36 in column B along the direction of rotation of the motor. Further, in FIG. 17, the coils are represented by thick solid lines; terminals of power source input side lead lines of the respective phases are represented by "circle"; and the neutral points of the respective phases are represented by "square". Further, in FIG. 17, the three-phase coils arranged in the slots are represented in two rows for the sake of simplicity of the drawing. Further in FIG. 18, the representation of the sectional shape, per se, of the coils in the slots S is omitted, the coils of the respective phases in the slots are represented by characters "+U", "−U", "+V", "−V", "+W", and "−W", and only the power source input side lead lines of the respective phases are represented by thick solid lines. In order to prevent the coils of the respective phases from crossing each other at the coil ends as illustrated in FIG. 18, the coils wound for each one pole pair are arranged in sequence for each of the three phases as illustrated in FIG. 17, and in addition, the coils between the same phases are connected in series. This provides an advantage in that the coil ends can be made small. However, when priority is given to preventing the coils of each phase from crossing at the coil ends, a state tends to occur in which the coils cross each other in the slots in a complicated manner, as can be seen from FIG. 17, thus complicating the work in which "for each phase, the coils molded for each one pole pair are engaged with the blades while all being connected in series", so that difficulty is encountered in automatic processing of the winding arrangement using a machine.

Further, as disclosed in Japanese Unexamined Patent Publication No. H4-265645, for example, an invention has been proposed which achieves a reduction of the winding man-hours and a decrease in the winding resistance by reducing the number of layers of unit coil in each slot in a synchronous motor, while maintaining an electric permeability that is equivalent to that of a multilayer winding and distributed winding arrangement.

SUMMARY OF THE INVENTION

As described above, according to the method in which for each phase, coils molded for each one pole pair are sequentially engaged with blades for each phase while all being connected in series, there is an advantage in that automatic processing of the winding arrangement using a machine is facilitated, but there is a problem in that the three phase coils cross each other in a complicated manner at the coil ends so that the coil ends become large. By contrast, according to the winding arrangement method in which the coils for each phase are prevented from crossing each other at the coil ends in order to make small the coil ends and permitted to cross each other in the slots, the task is complicated in which "for each phase, the coils molded for each one pole pair are engaged with blades while all being connected in series", so that difficulty is encountered in achieving automatic processing of the winding arrangement using a machine.

Accordingly, in view of the foregoing problems, it is an object of the present invention to provide a radial gap-type motor in which a distributed winding type winding arrangement can be achieved which can be easily configured without the coil ends becoming large, and a winding arrangement method therefor.

In order to achieve the above object, according to the present invention, the winding arrangement method for the radial gap-type motor in which an n-pole-pair (n is integral times of 4) three-phase winding wound in a distributed winding form is inserted in slots of a stator, including: a coil forming step that, for each of three phases, forms coils wound for each one pole pair; a coil group forming step that, for each phase, forms a first coil group by connecting odd-number-th coils along a direction of rotation via crossover wires, and forms a second coil group by connecting even-number-th coils along the direction of rotation via crossover wires; and a parallel-connecting step that, for each phase, connects the first coil group and the second coil group at one end in a manner such that the first coil group and the second coil group are in a parallel-connected relationship to each other, to form a current input side lead wire at a point of the connection, and connects the first coil group and the second coil group at the other end, to form a neutral point at a point of the connection.

Further, the winding arrangement method for the radial gap-type motor may further include: a first inserting step that, after the coil group forming step, inserts either one of the first coil group and the second coil group in slots of a stator; an insulating step that, after the first inserting step, arranges insulation components for inter-phase insulation in a vicinity of coil ends where the lead wires and the neutral points are to be arranged and in the slots, respectively; and a second inserting step that, after the insulating step and before the parallel-connecting step, inserts the other one of the first coil group and the second coil group in the slots.

Further, the winding arrangement method for the radial gap-type motor may further include: an insulating step that, after the parallel-connecting step, arranges an insulation component formed with grooves for accommodating the lead wires and the crossover wires in the vicinity of the coil ends where the lead wires and the neutral points are arranged; and an accommodating step that, after the insulating step, accommodates the lead wires and the crossover wires in the grooves.

In the present invention, a radial gap-type motor in which an n-pole-pair (n is integral times of 4) three-phase winding wound in a distributed winding form is inserted in slots of a stator, including: a first coil group provided for each of the three phases in which of coils wound for each one pole pair, odd-number-th coils along a direction of rotation are connected via crossover wires; a second coil group provided for each phase in which of the coils wound for each pole pair, even-number-th coils along the direction of rotation are connected via crossover wires; a current input side lead wire provided for each phase and extending from one of the connection points between the first coil group and the second coil group which are connected in parallel to each other; a neutral point provided for each phase and being the other one of the connection points between the first coil group and the second coil group which are connected in parallel to each other; and slots that accommodate the first coil group and the second coil group.

Further, the radial gap-type motor may further include insulation components for inter-phase insulation, wherein the insulation components are arranged in the vicinity of the coil ends where the lead wires and the neutral points are arranged and in the slots.

Further, the radial gap-type motor may further include an insulation component formed with grooves accommodating the lead wires and the crossover wires, wherein the insulation component is arranged in the vicinity of the coil ends where the lead wires and the neutral points are arranged.

BRIEF DESCRIPTION OF THE DRAWINGS

The present invention will be more clearly understood by referring to the accompanying drawings.

DETAILED DESCRIPTION

Figure 1:
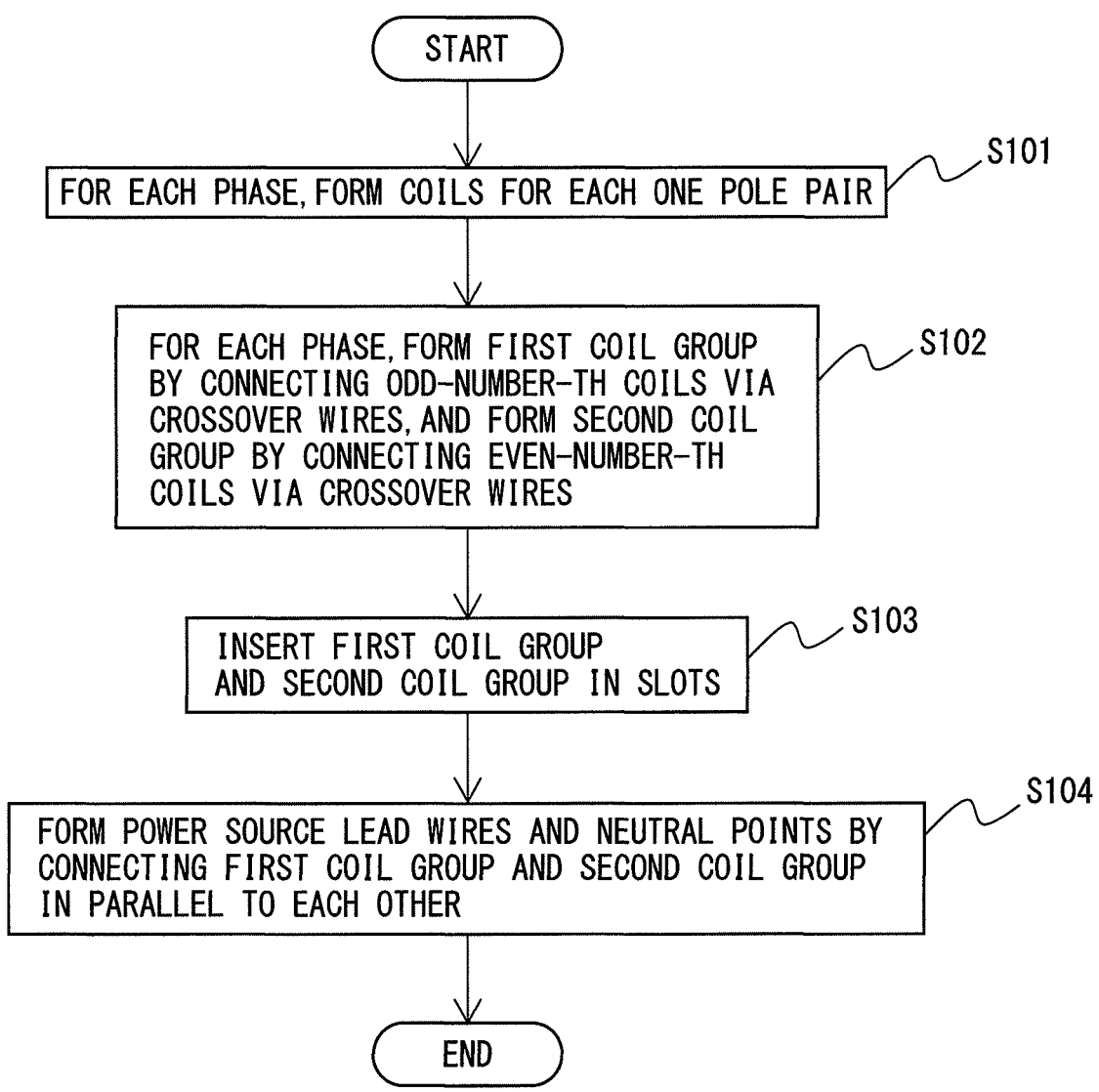
FIG. 1 is a flow chart for explaining a winding arrangement method for the radial gap-type motor according to a first embodiment of the present invention.

Referring to the drawings, description will now be made of a radial gap-type motor in which an n-pole-pair (n is integer times of 4) three-phase winding wound in a distributed winding form is inserted in slots of a stator, and a winding arrangement therefor. However, it should be understood that the present invention is not limited in any way to the drawings or embodiments described below.

Figure 2:
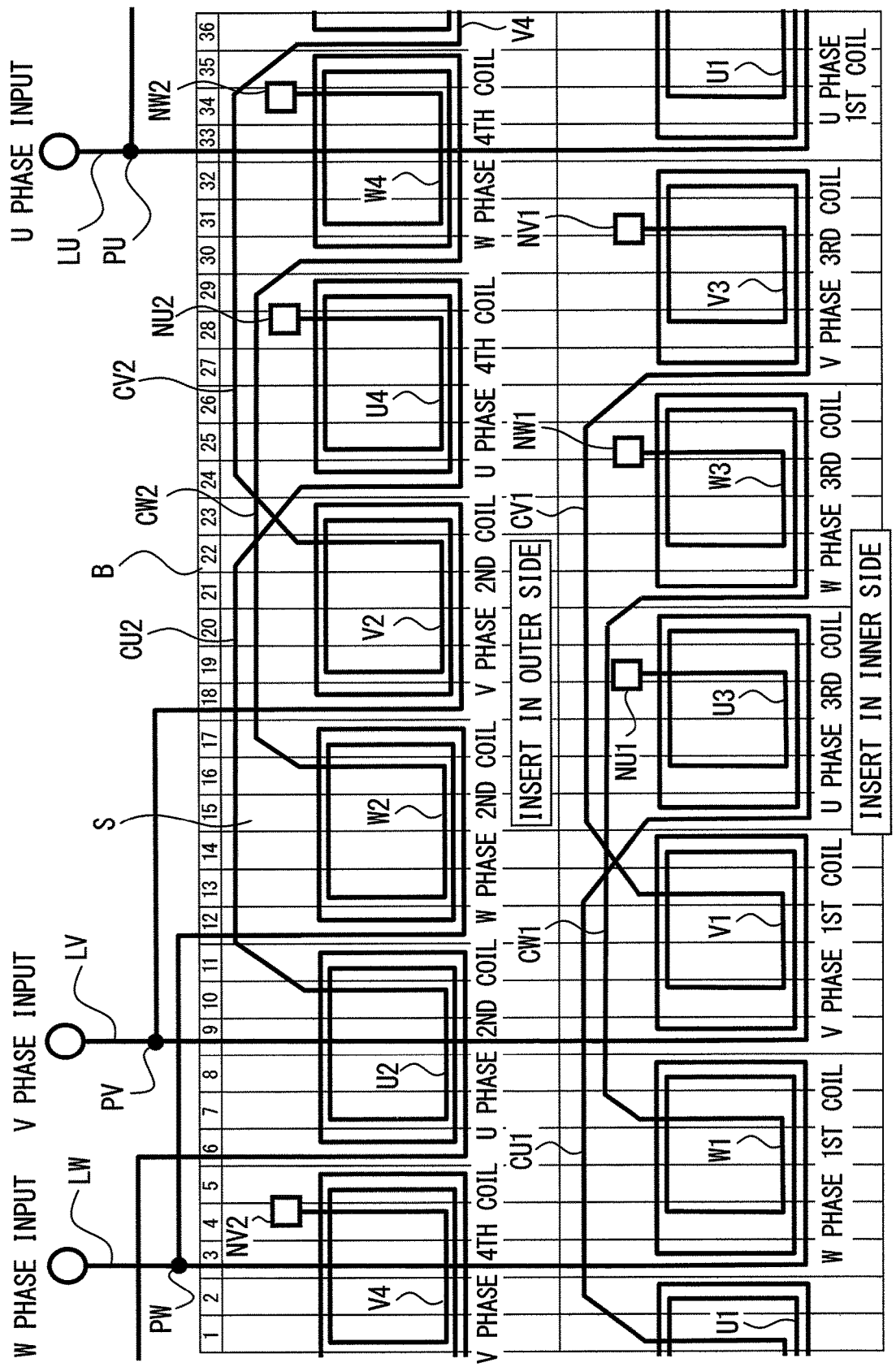
FIG. 2 is a developed sectional view schematically illustrating an example of winding arrangement with 8 pole pairs and 36 slots for the radial gap-type motor according to the first embodiment of the present invention.
Figure 3:
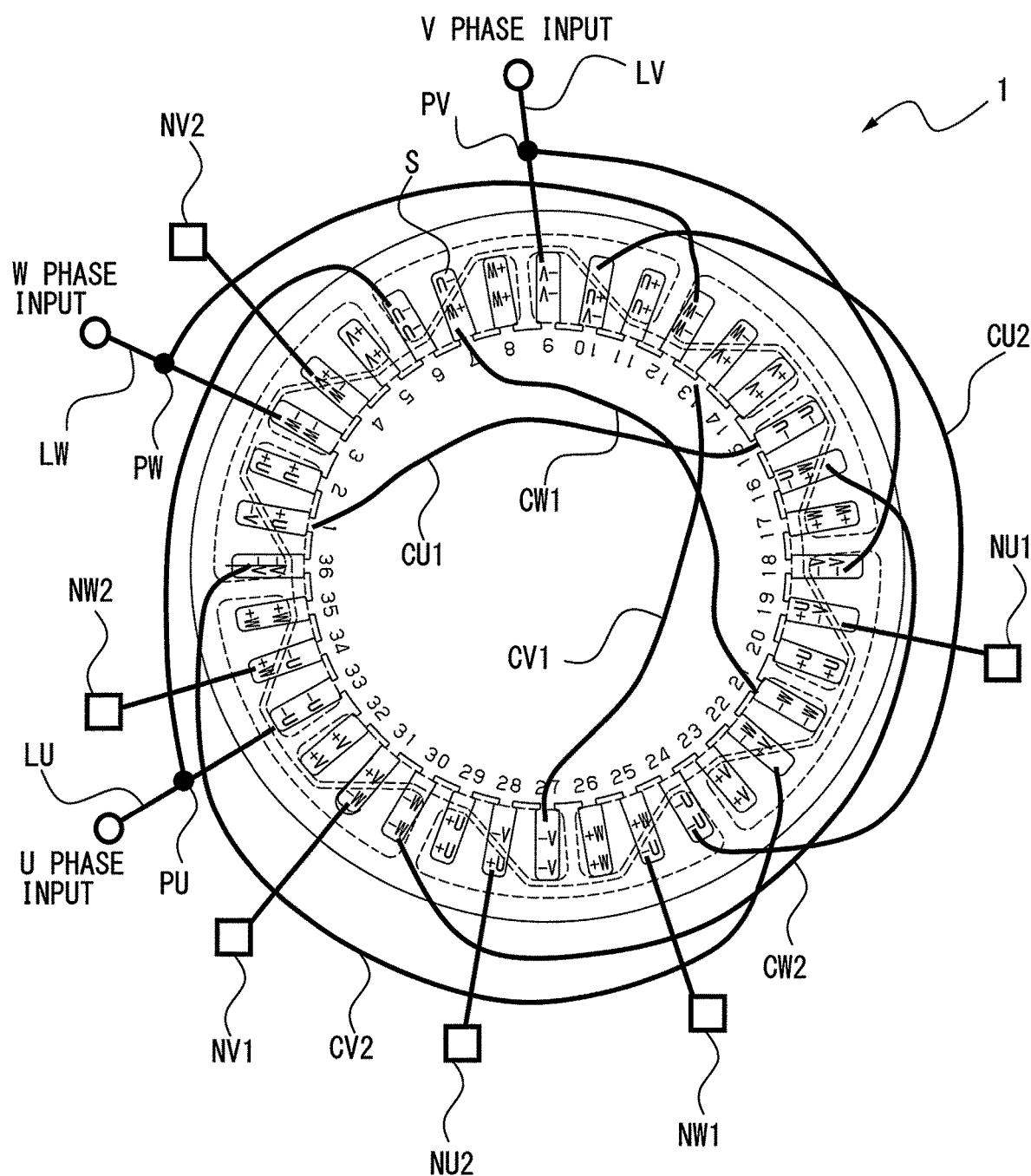
FIG. 3 is a cross-sectional view illustrating the winding arrangement with 8 pole-pairs and 36 slots for the radial gap-type motor illustrated in FIG. 2.

FIG. 1 is a flow chart for explaining the operation flow of a winding arrangement method for the radial gap-type motor according to a first embodiment of the present invention. FIG. 2 is a developed sectional view schematically illustrating an example of an 8-pole-pair and 36-slot winding arrangement for the radial gap-type motor according to the first embodiment of the present invention. FIG. 3 is a cross-sectional view illustrating the 8-pole-pair and 36-slot winding arrangement for the radial gap-type motor illustrated in FIG. 2. As an example, description is herein made of a distributed winding for a radial gap-type motor 1 with 8 pole-pairs and 36 slots. In FIGS. 2 and 3, slots S are assigned identification numerals 1-36, respectively, in column B along the direction of rotation of the motor. Further in FIG. 2, coils are represented by thick solid lines, terminals of power source input side lead lines of the respective phases are represented by a "circle", and the neutral points of the respective phases are represented by a "square". Further in FIG. 3, the representation of the sectional shape, per se, of the coils in the slots S is omitted, the coils of the respective phases in the slots are represented by characters "+U", "−U", "+V", "−V", "+W", and "−W", and only the power source input side lead lines of the respective phases are represented by thick solid lines.

First, at step S101, corresponding coils are wound for each one pole pair with respect to each of the three phases (U phase, V phase, and W phase). In this connection, the present invention is not particularly limited as to the slot pitch and the number of winding turns. The number of pole pairs and the number of slots illustrated in FIG. 2 are merely by way of example. The formed coils for each phase are numbered along the direction of rotation as follows. For the 8 pole pairs illustrated in FIGS. 2 and 3, for example, the coils for the U phase are denoted as U phase first coil U1, U phase second coil U2, U phase third coil U3, and U phase fourth coil U4. Likewise, the coils for V phase are denoted as V phase first coil V1, V phase second coil V2, V phase third coil V3, and V phase fourth coil V4. Likewise, the coils for the W phase are denoted as W phase first coil W1, W phase second coil W2, W phase third coil W3, and W phase fourth coil W4.

Then, at step S102, for each phase, the odd-numbered coils along the direction of ration are connected via a crossover wire to form a first coil group, and the even-numbered coils along the direction of rotation are connected via a crossover wire to form a second coil group. For example, in the example of FIGS. 2 and 3, for the U phase, the U phase first coil U1 and the U phase third coil U3, which are odd-number-th coils, are connected via a crossover wire CU1 to form a first coil group, and the U phase second coil U2 and the U phase fourth coil U4, which are even-number-th coils, are connected via a crossover wire CU2 to form a second coil group. Likewise, for the V phase, the V phase first coil V1 and the V phase third coil V3, which are odd-number-th coils, are connected via a crossover wire CV1 to form a first coil group, and the V phase second coil V2 and the V phase fourth coil V4, which are even-number-th coils, are connected via a crossover wire CV2 to form a second coil group. Likewise, for W phase, the W phase first coil W1 and the W phase third coil W3, which are odd-number-th coils, are connected via a crossover wire CW1 to form a first coil group, and the W phase second coil W2 and the W phase fourth coil W4, which are even-numbered coils, are connected via a crossover wire CW2 to form a second coil group.

Then, at step S103, the first coil group and the second coil group formed for each phase are inserted in a slot S in such a manner as to form a two-layer winding with the interior of the slot S being divided into inner side and outer side. In the following explanation of the two-layer winding, the positional relationship in the radial direction between the first coil group and the second coil group in the slot S will be referred to simply as "inner side" and "outer side". In the example of FIGS. 2 and 3, in order to form a distributed winding arrangement, for the first coil group for each phase, the respective coils are arranged to be aligned in the order of U phase, W phase, and V phase along the direction of rotation, and also for the second coil group of each phase, the respective coils are arranged to be aligned in the order of U phase, W phase, and V phase along the direction of rotation; and in addition, in order to provide a two-layer winding, the first coil group, which is the odd-number-th coil group for each phase, and the second coil group, which are the even-number-th coil group for each phase, are inserted at the inner side and at the outer side in the slot S, respectively. As an alternative, the first coil group, which is the odd-number-th coil group for each phase, and the second coil group, which is the even-number-th coil group for each phase may be inserted at the outer side and at the inner side in the slot S, respectively.

For the insertion in the slot S at step S103 may be used the above-described blades, for example. In other words, for the first coil group for each phase, the coils are engaged with the inner blades in a manner such that the respective coils are aligned in the order of U phase, W phase, and V phase along the direction of rotation, and for the second coil group for each phase, the coils are engaged with the outer blades in a manner that the respective coils are aligned in the order or U phase, W phase, and V phase along the direction of rotation; and a stator core is set beyond these blades, and then by inserting an insert rod formed with projections each having a width substantially equal to that of the slot opening portion and an outer diameter substantially equal to the inner diameter of the stator core, the coil is inserted in the slot S from the slot opening portion of the stator core. In this manner, according to the first embodiment of the present invention, it turns out to be a simple task that "for each phase, the first and the second coil group in which all the coils molded for each one pole pair are connected in series are sequentially engaged with the blades for each phase, and the resultant structure is inserted in the stator core", and the layout of each coil to be engaged with the blades as illustrated in FIG. 3 is also simplified, thereby facilitating automatic processing of the winding arrangement using a machine.

Then, at step S104, for each phase, the first coil group and the second coil group are connected to each other at one end so as to be in parallel-connected relationship with each other; and a current input side lead wire is formed at the connection point, and the first coil group and the second coil group are connected to each other at the other end so that the connection point is defined as a neutral point. In the example illustrated in FIGS. 2 and 3, for U phase, the first coil group and the second coil group are connection at one end, and a current input side lead wire LU is formed at the connection point PU; and the first coil group and the second coil group are connected to each other at the other end, and the connection point is defined as neutral points NU1 and NU2. Likewise, for V phase, the first coil group and the second coil group are connection at one end, and a current input side lead wire LV is formed at the connection point PV; and the first coil group and the second coil group are connected to each other at the other end, and the connection point is defined as neutral points NV1 and NV2. Likewise, for W phase, the first coil group and the second coil group are connection at one end, and a current input side lead wire LW is formed at the connection point PW; and the first coil group and the second coil group are connected to each other at the other end, and the connection point is defined as neutral points NW1 and NW2. In this connection, in FIGS. 2 and 3, for the sake of simplicity of the drawings, wire connections among the neutral points NU1 and NU2, NV1 and NV2, and NW1 and NW2 are not shown, but in actuality, the neutral points NU1 and NU2, NV1 and NV2, and NW1 and NW2 are wire-connected to each other.

The 8-pole-pair radial gap-type motor 1 obtained by the above-described winding arrangement method includes: the first coil group in which the odd-number-th coils U1 and U3, V1 and V3, and W1 and W3 along the direction of rotation are connected via crossover wires CU1, CV1, and CW1; the second coil group in which the even-number-th coils U2 and U4, V2 and V4, and W2 and W4 along the direction of rotation are connected via crossover wires CU2, CV2, and CW2; the current input side lead wires LU, LV, and LW extending from the connection points PU, PV, and PW on one side in the first coil group and the second coil group connected in parallel to each other; the neutral points NU1 and NU2, NV1 and NV2, and NW1 and NW2 which are the other connection points on one side in the first coil group and the second coil group connected in parallel to each other; and the slots S for accommodating the first coil group and the second coil group. As illustrated in FIG. 2, the three-phase power source input side lead wires LU, LV, and LW are arranged in a neat manner and with less crossing so that the coil ends are prevented from becoming large, and thus the winding resistance can be decreased as compared with the convention technique.

Figure 15:
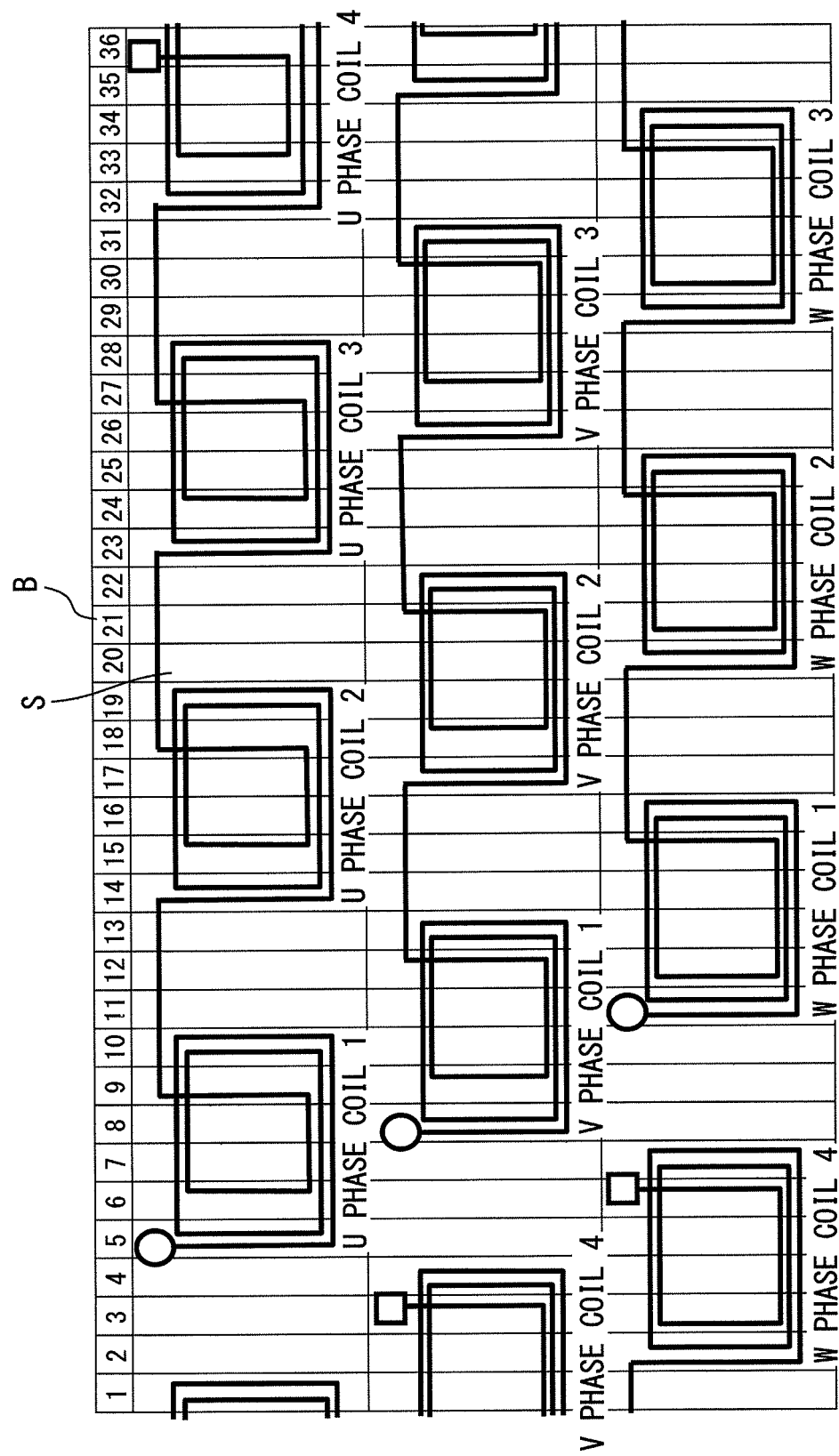
FIG. 15 is a developed sectional view schematically illustrating an example of an 8 pole-pair and 36 slot winding arrangement for a conventional distributed winding radial gap-type motor.
Figure 16:
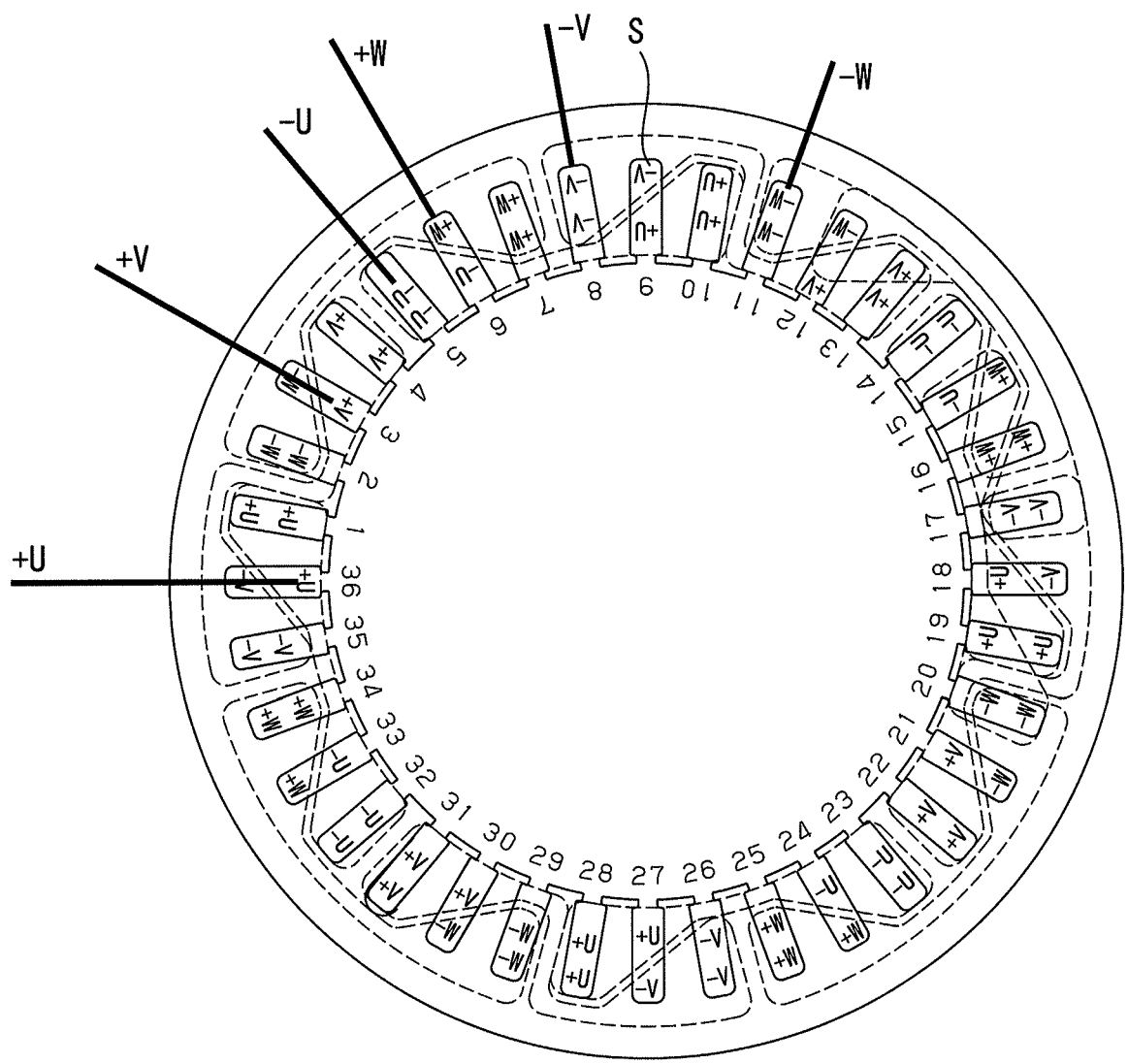
FIG. 16 is a cross-sectional view illustrating the 8 pole-pair and 36 slot winding arrangement for the radial gap-type motor illustrated in FIG. 15.

As described above, according to the first embodiment of the present invention, it turns out to be a simple task that "for each phase, the first and the second coil group in which all the coils molded for each one pole pair are connected in series are engaged with the blades as they are, and the resultant structure is inserted in the stator core"; thus, the winding arrangement for distributed winding can be easily achieved so that mechanization and automatic processing by machine are facilitated with respect to the processing for forming and inserting the coils. Further, according to the first embodiment of the present invention, the coils are less likely to cross each other at the coil ends and the winding resistance can be decreased as compared with conventional technique illustrated in FIGS. 15 and 16 in which the winding arrangement by a machine is likewise possible.

Figure 4:
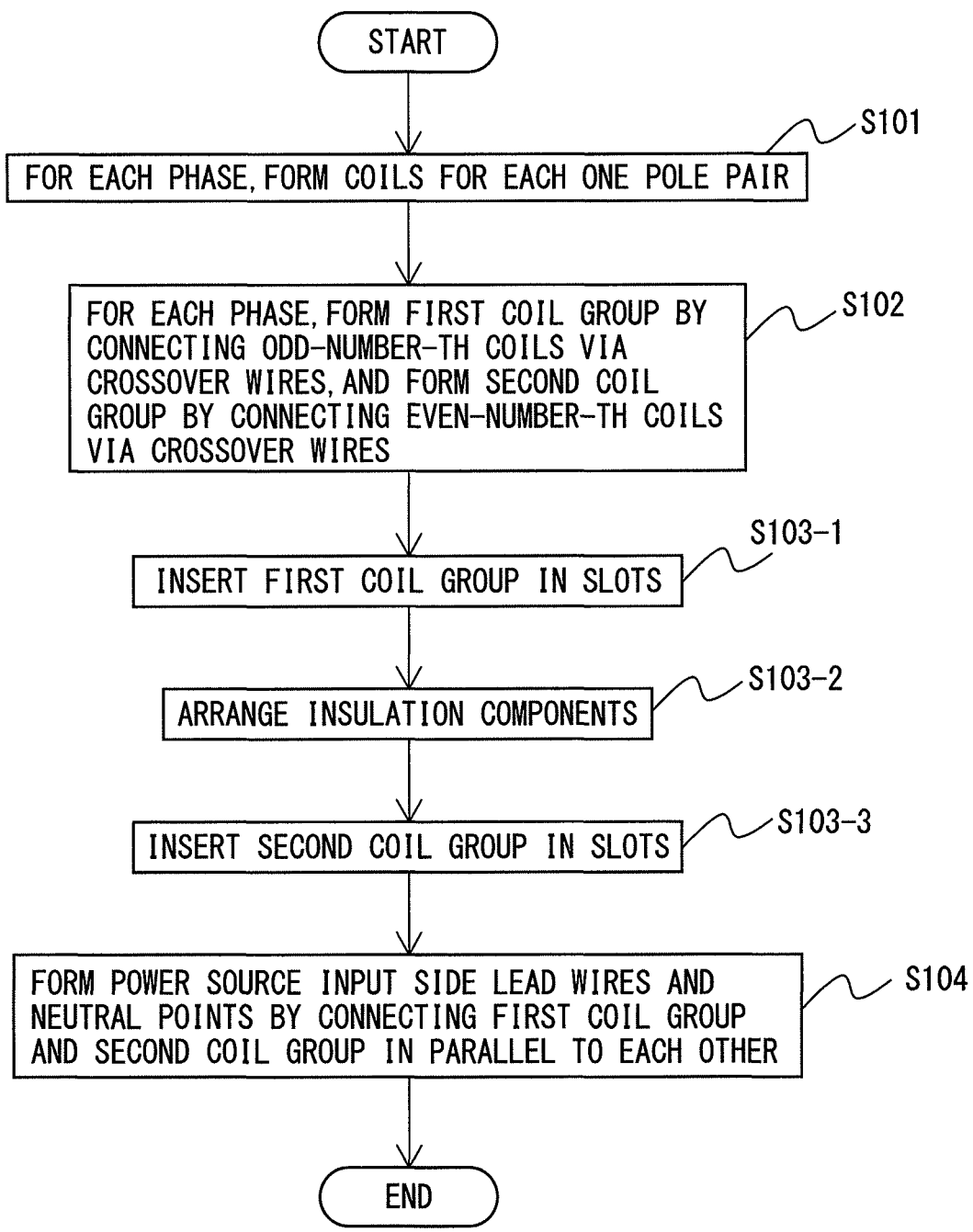
FIG. 4 is a flow chart for explaining the operation flow of a winding arrangement method for the radial gap-type motor according to a second embodiment of the present invention.
Figure 5:
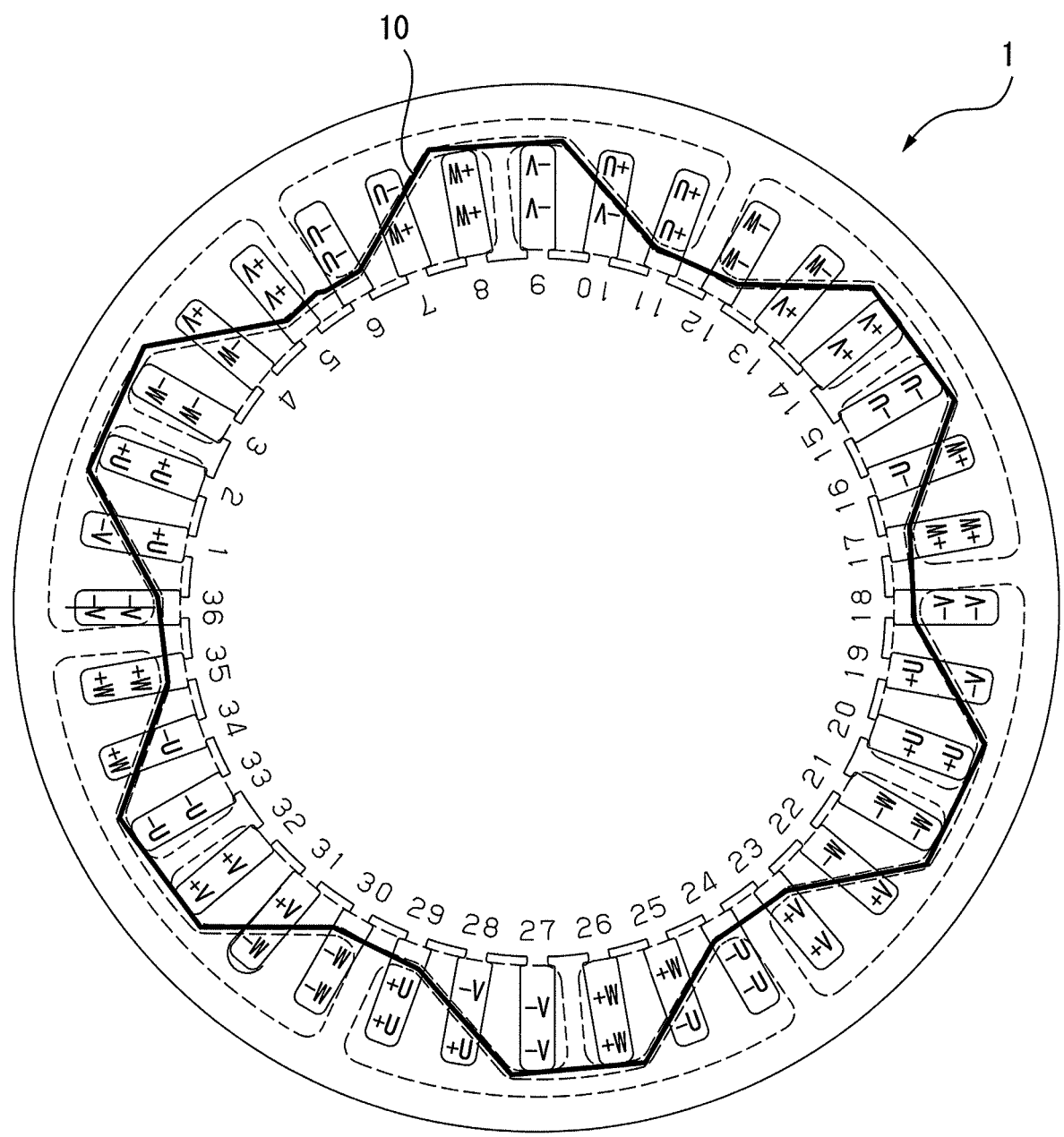
FIG. 5 is a cross-sectional view illustrating inter-phase insulation between coil ends of the radial gap-type motor with 8 pole pairs and 36 slots in the second embodiment of the present invention.
Figure 6:
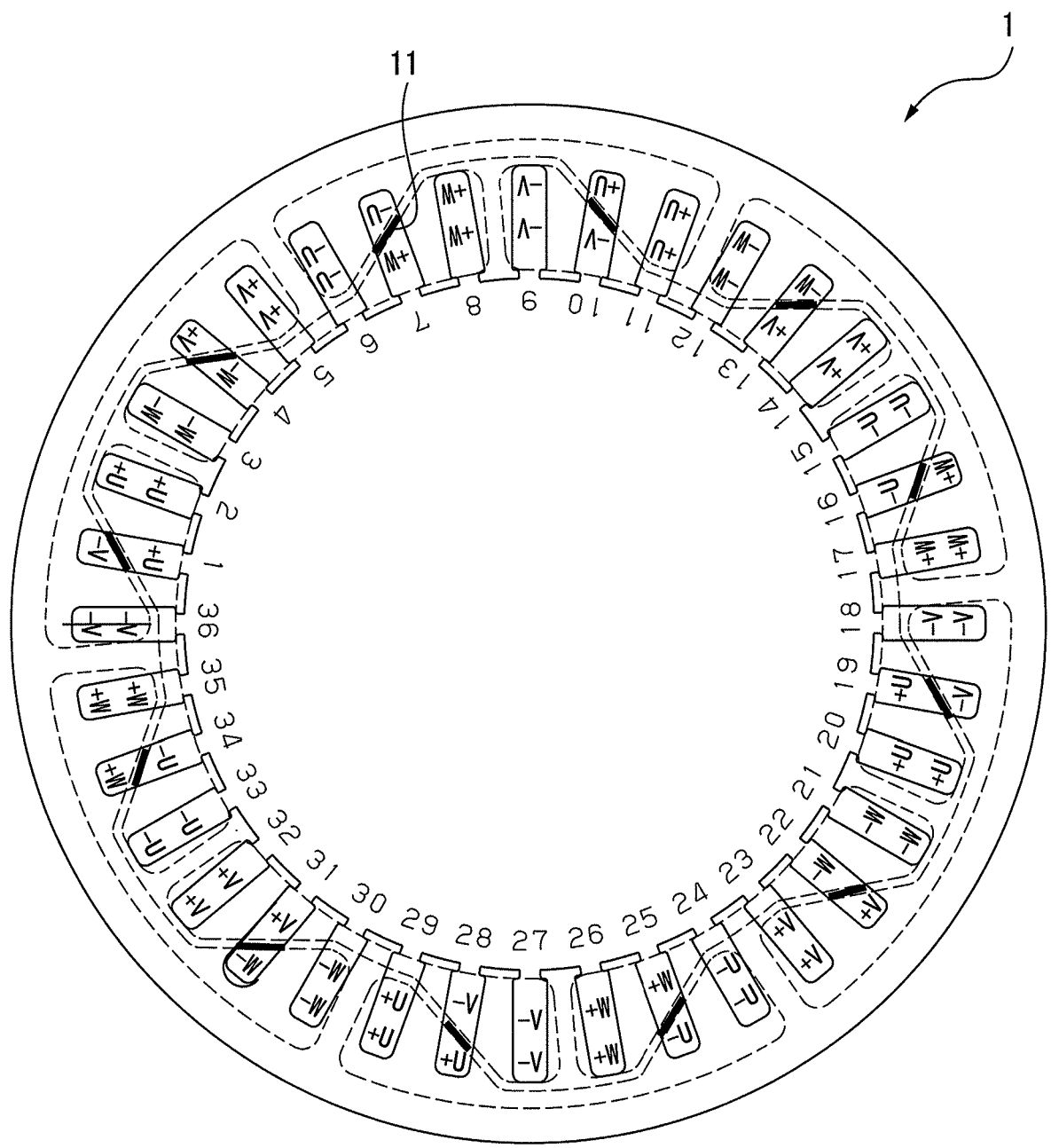
FIG. 6 is a cross-sectional view illustrating inter-phase insulation in a stator of the radial gap-type motor with 8 pole pairs and 36 slots in the second embodiment of the present invention.

Description will next be made of a second embodiment of the present invention. The second embodiment of the present invention is such that a processing for inserting an insulation component between the first coil group and the second coil group is added to the above-described first embodiment. FIG. 4 is a flow chart for explaining the operation flow of a winding arrangement method for the radial gap-type motor according to the second embodiment of the present invention. FIG. 5 is a cross-sectional view illustrating inter-phase insulation between coil ends of the radial gap-type motor with 8 pole pairs and 36 slots in the second embodiment of the present invention. FIG. 6 is a cross-sectional view illustrating inter-phase insulation in a stator of the radial gap-type motor with 8 pole pairs and 36 slots in the second embodiment of the present invention. In this connection, in FIGS. 5 and 6, the lead wires and the neutral points described in the foregoing first embodiment are not shown for the sake of simplicity of the drawings.

Steps S101 and S102 in the second embodiment of the present invention are similar to Steps S101 and S102 in the first embodiment, respectively. In other words, at step S101, for each of the three phases (U phase, V phase, and W phase), the corresponding coil is wound for each one pole pair, and subsequently at step S102, the odd-number-th coils along the direction of rotation are connected via crossover wires to form a first coil group, and the even-number-th coils along the direction of rotation are connected via crossover wires to form a second coil group.

At subsequent step S103-1, either one of the first coil group and the second coil group is inserted in slots of a stator. In the example illustrated in FIG. 4, the first coil group is inserted in the slots S. In this regard, as in the first embodiment, in order to form a distributed winding arrangement, for the first coil group for each phase, the coils are engaged with the inner blades in a manner such that the respective coils are aligned in the order of U phase, W phase, and V phase along the direction of rotation, and a stator core is set beyond the inner blades; and by inserting an insert rod including projections each having a width substantially equal to that of the slot opening portion and an outer diameter substantially equal to the inner diameter of the stator core, the coils are inserted in the slots S from the slot opening portions of the stator core.

Then, at step S103-2, an insulation component for inter-phase insulation is arranged in the vicinity of the coil ends where the lead wires and the neutral points are to be arranged and in the slots S in which the first coil group is inserted. For example, as illustrated in FIG. 5, an insulation component 10 (represented by a thick solid line in the drawing) is inserted in the vicinity of the coil ends where the lead wires and the neutral points are arranged, and as illustrated in FIG. 6, an insulation component 11 (represented by a thick solid line) is inserted in the vicinity of the coil ends where the lead wires and the neutral points are arranged, and the insulation component 11 is inserted in the slots. The material, per se, of the insulation components 10 and 11 does not limit the present invention in any way, but any common insulating material may be used that is used for inter-phase insulation of a motor.

Subsequently, at step S103-3, the other one of the first coil group and the second coil group is inserted in the slots of the stator. In the example illustrated in FIG. 4, at step S103-3, the second coil group is inserted in the slots S on the outer side since the first coil group has already been inserted in the slots S on the inner side at step S103-1. In this regard, as in the first embodiment, in order to form a distributed winding arrangement, for the second coil group for each phase, the coils are engaged with the outer blades in a manner such that the respective coils are aligned in the order of U phase, W phase, and V phase along the direction of rotation, and a stator core is set beyond the outer blades; and by inserting an insert rod including projections each having a width substantially equal to that of the slot opening portion and an outer diameter substantially equal to the inner diameter of the stator core, the coils are inserted in the slots S from the slot opening portions of the stator core. Since, at step S103-1, the first coil group is inserted in the slots S on the inner side and at step S103-2, the insulating materials 10 and 11 are inserted, it follows, after the processing at step S103-3, that in the slots S, the insulating material 11 is located between the first coil group and the second coil group so that inter-phase insulation in the slots S can be secured.

As an alternative, the above-mentioned steps S103-1 and S103-3 may be exchanged and carried out.

The step S104 in the second embodiment of the present invention is similar to the step S104 in the first embodiment. In other words, at step S104, for each phase, the first coil group and the second coil group are connected to each other at one end so as to be in parallel-connected relationship with each other; and a current input side lead wire is formed at the connection point, and the first coil group and the second coil group are connected to each other at the other end so that the connection point is defined as a neutral point.

Figure 17:
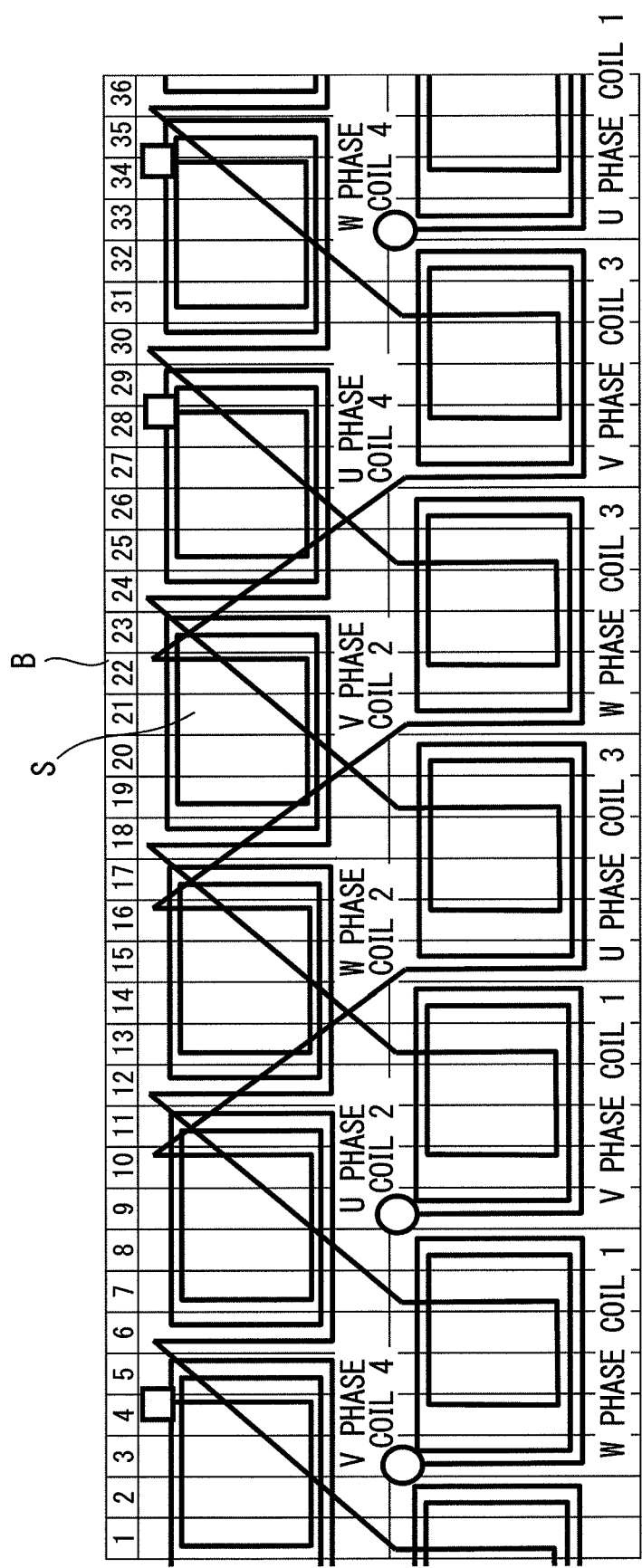
FIG. 17 is a developed sectional view schematically illustrating another example of an 8 pole-pair and 36 slot winding arrangement for a conventional distributed winding radial gap-type motor.
Figure 18:
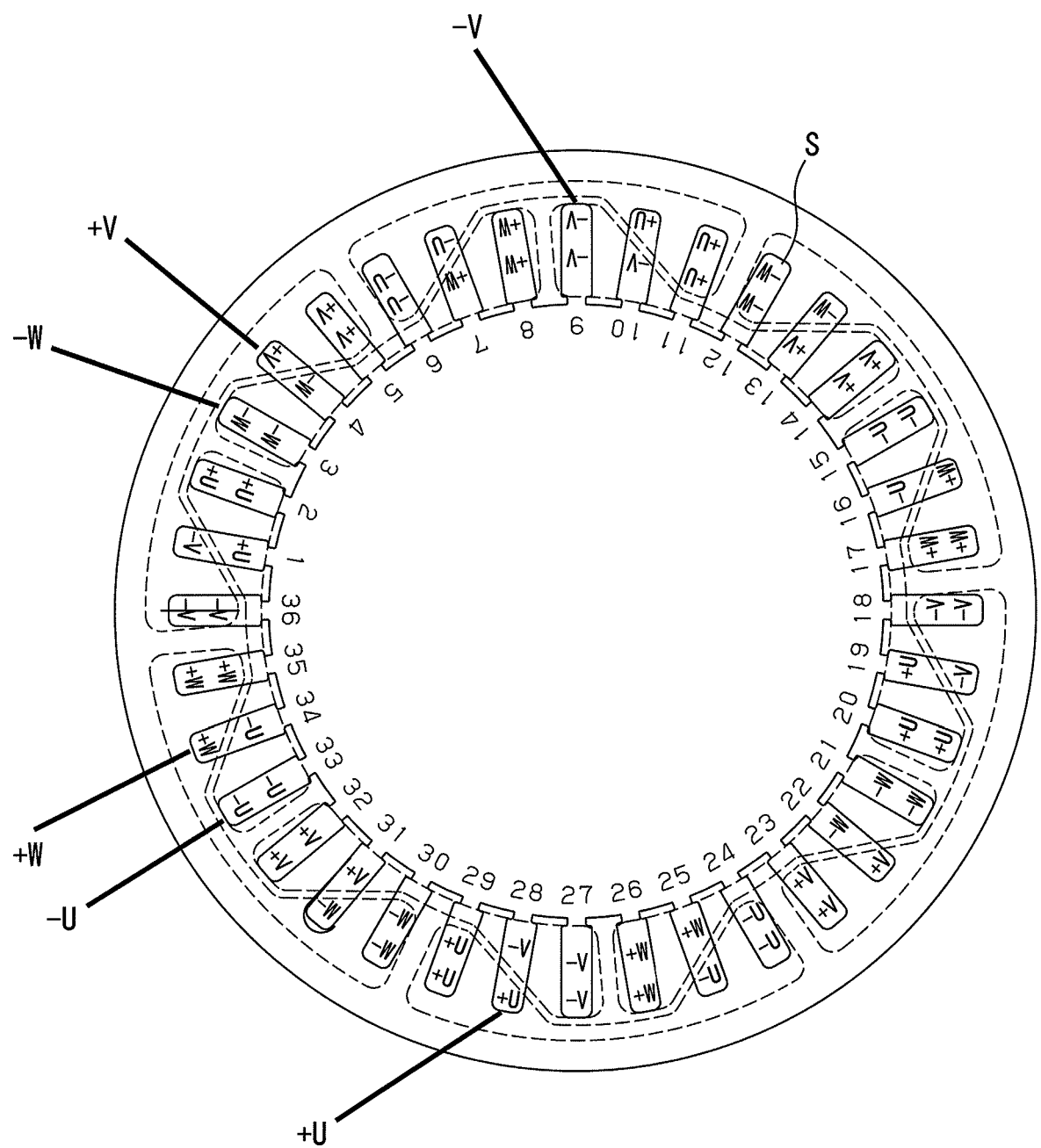
FIG. 18 is a cross-sectional view illustrating the 8 pole-pair and 36 slot winding arrangement for the radial gap-type motor illustrated in FIG. 17.

In this manner, the second embodiment of the present invention is such that in the first embodiment described above, a processing for inserting insulating materials between the first coil group and the second coil group is added, whereby in the 8-pole-pair radial gap-type motor 1, the insulating material 10 is arranged in the vicinity of the coil ends where the lead wires LU, LV, and LW and the neutral points NU1, NU2, NV1, NV2, NW1 and NW2 are arranged and the insulating material 11 is arranged in the slots S. For example, in the conventional technique illustrated in FIGS. 17 and 18, coils connected in series to each other are inserted in slots collectively for three phases, but after such insertion, it is difficult to insert an insulating component to secure inter-phase insulation between the coils in the slots. In contrast, according to the second embodiment of the present invention, the insulating material is arranged after the insertion of the first coil group, and then the insertion of the second coil group is carried out, so that the inter-phase insulation can be easily achieved, and mechanization and automatic processing by machine are facilitated with respect to not only the processing for forming and inserting the coils in the slots but also the inter-phase insulation processing.

Figure 7:
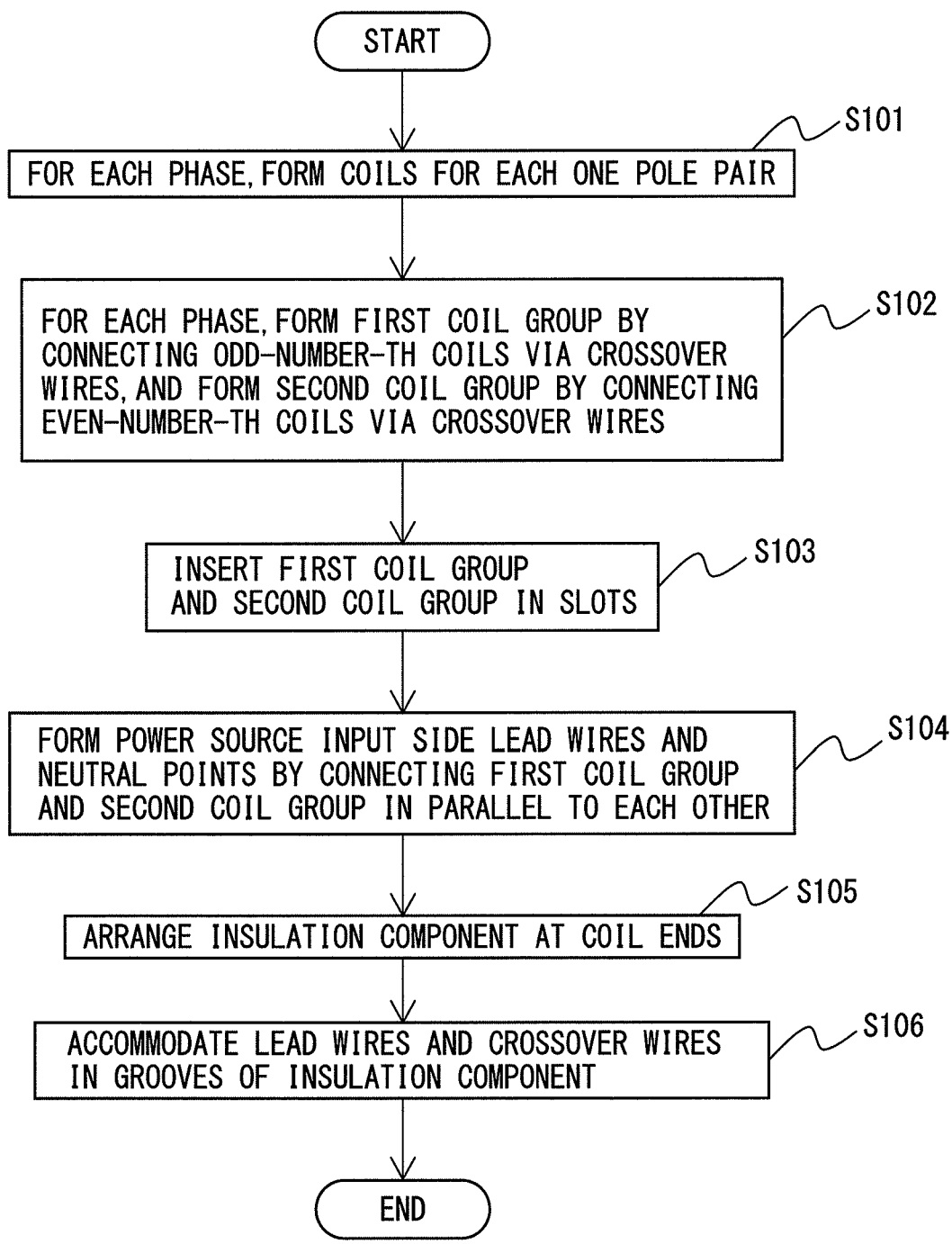
FIG. 7 is a flow chart for explaining the operation flow of the winding arrangement method for the radial gap-type motor according to a third embodiment of the present invention.

A third embodiment of the present invention is described next. The third embodiment of the present invention is such that in the first embodiment described above, a process is added for arranging an insulation component formed with grooves accommodating lead wires and crossover wires arranged in the vicinity of coil ends where the lead wires and the neutral points are arranged. FIG. 7 is a flow chart for explaining the operation flow of a winding arrangement method for the radial gap-type motor according to the third embodiment of the present invention. Further, FIG. 8 is a perspective view illustrating an insulation component in the third embodiment of the present invention.

Steps S101 to S104 in the third embodiment of the present invention are similar to steps S101 to S104 in the first embodiment, respectively. In other words, at step S101, for each of the three phases (U phase, V phase, and W phase), the corresponding coil is wound for each one pole pair, and subsequently at step S102, the odd-number-th coils along the direction of rotation are connected via crossover wires to form a first coil group, and the even-number-th coils along the direction of rotation are connected via crossover wires to form a second coil group. Further, at step S103, the first coil group and the second coil group formed for each phase are inserted in slots S in a manner such that the respective coils are arranged in the form of a two-layer winding with the interior of the slots S being divided into inner-side and outer-side. Then, at step S104, for each phase, the first coil group and the second coil group are connected to each other at one end so as to be in parallel-connected relationship with each other; and a current input side lead wire is formed at the connection point, and the first coil group and the second coil group are connected to each other at the other end so that the connection point is defined as a neutral point.

Figure 8:
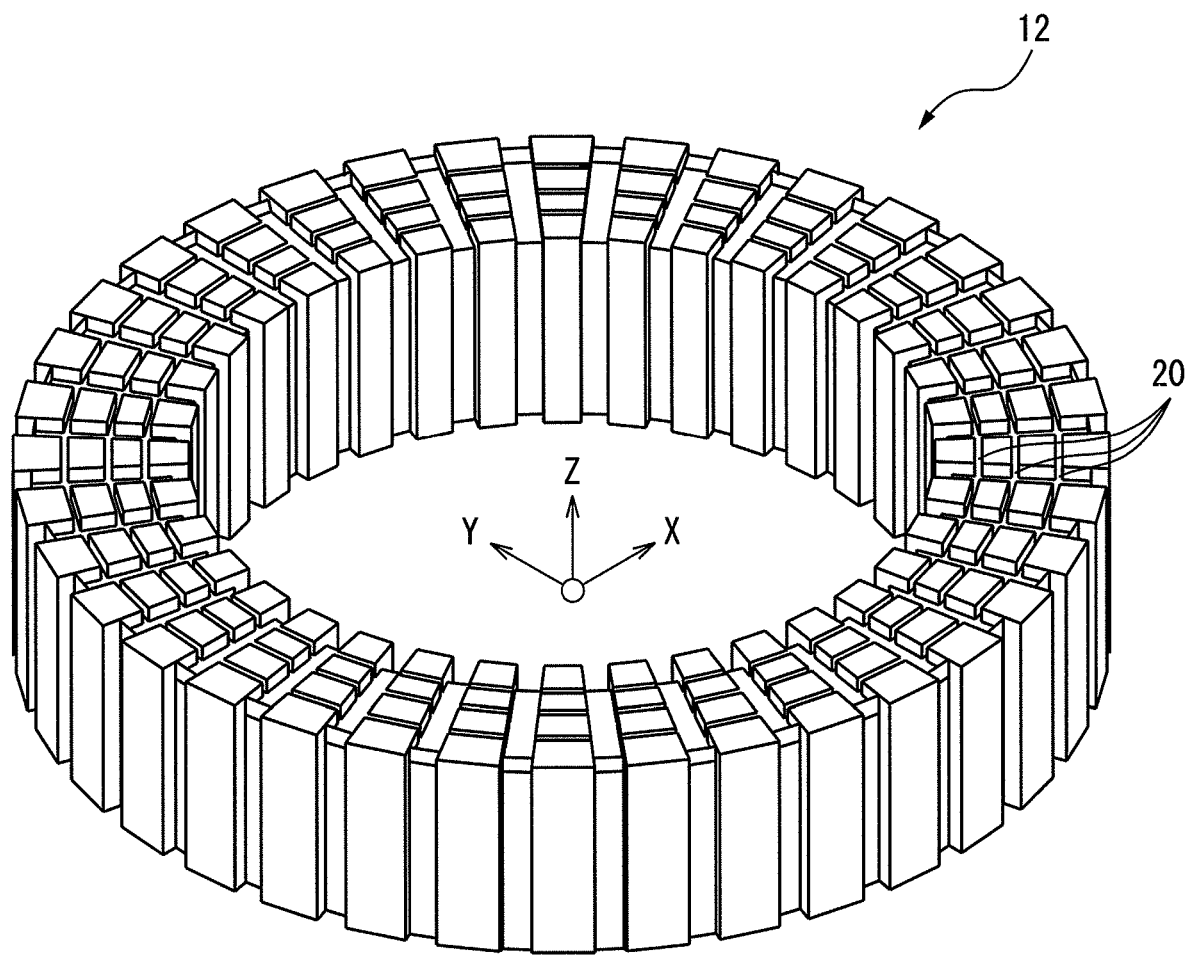
FIG. 8 is a perspective view illustration an insulation in the third embodiment of the present invention.
Figure 9:
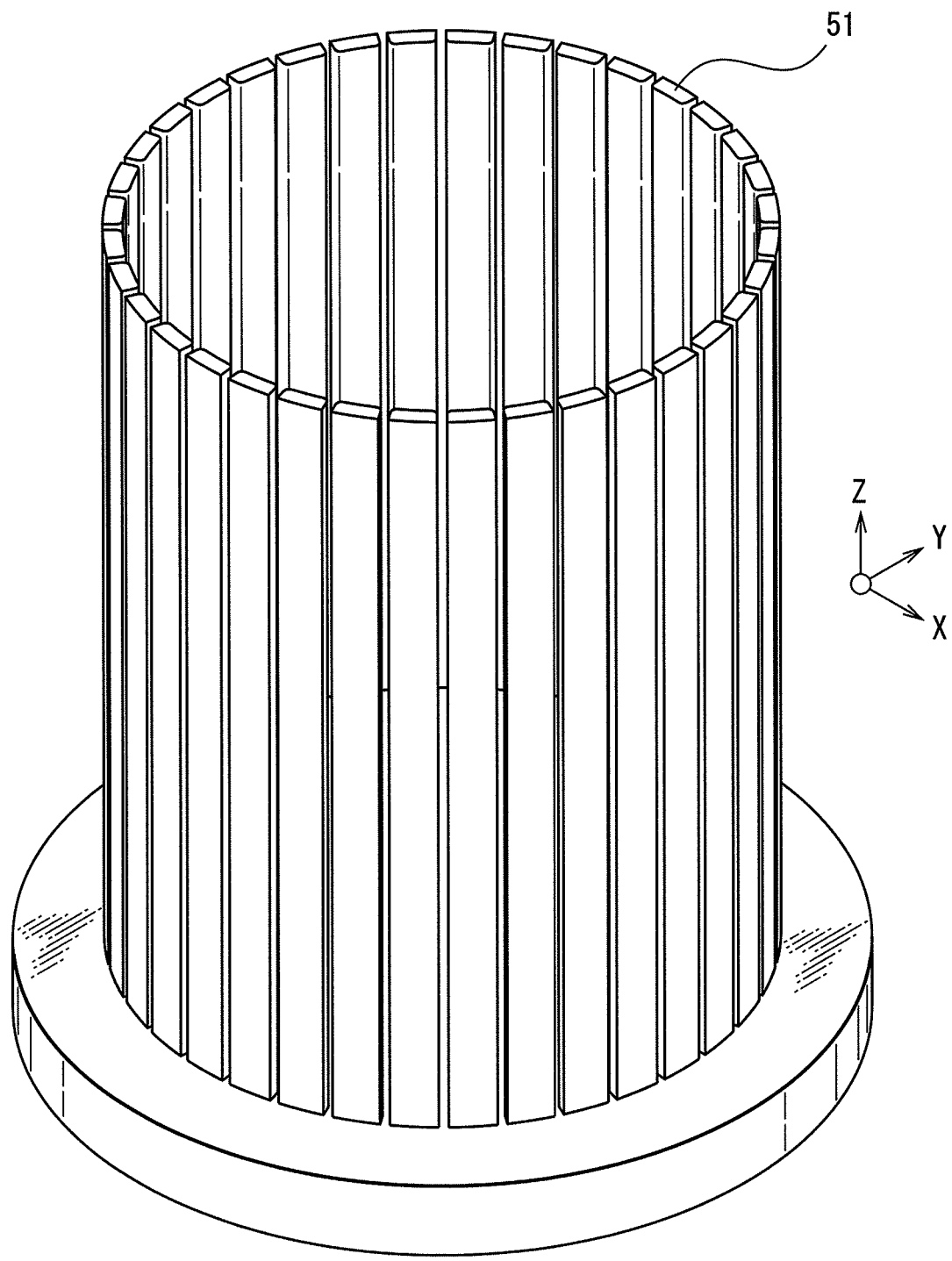
FIG. 9 is a perspective view illustrating blades to be used for distributed windings.
Figure 10:
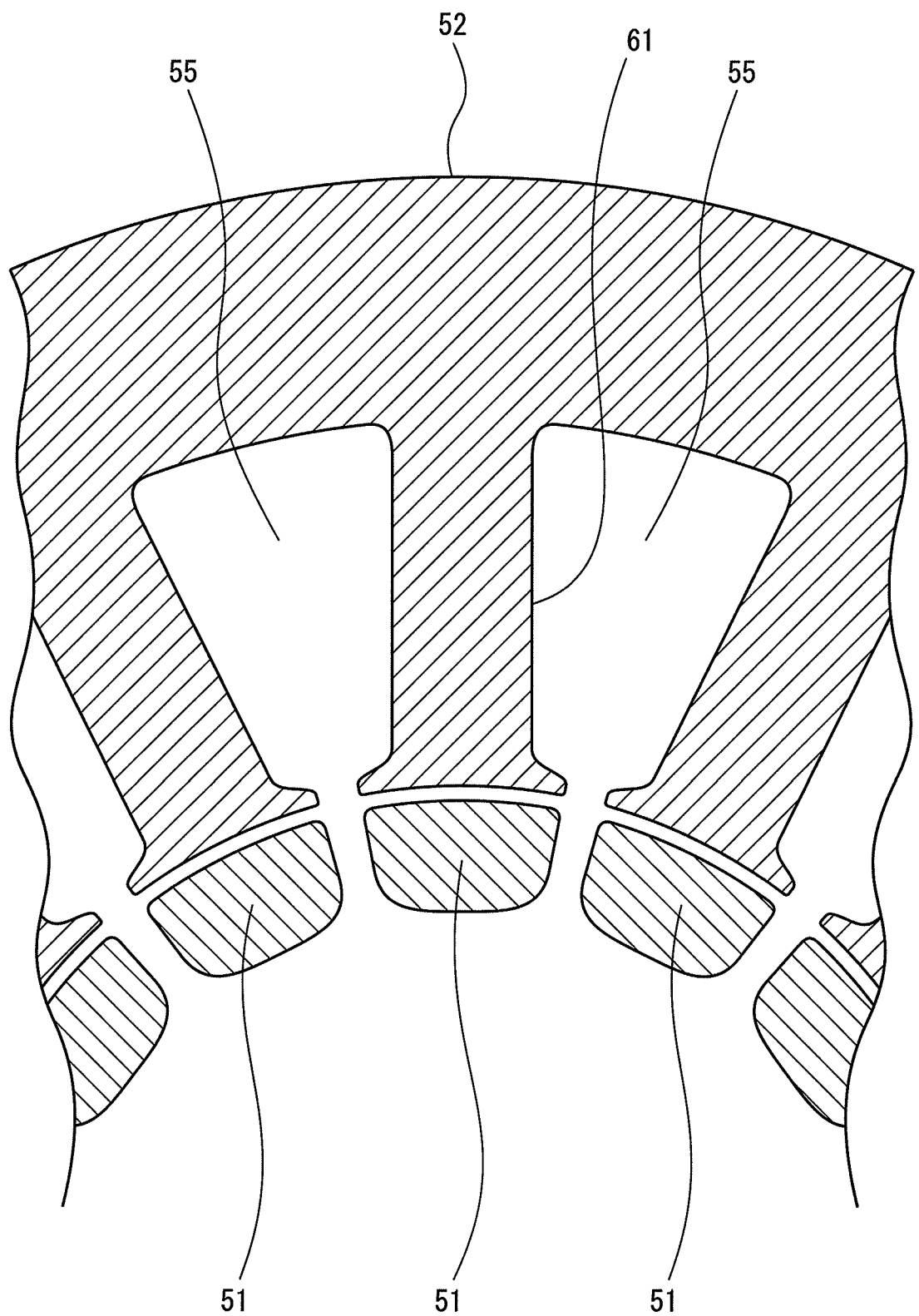
FIG. 10 is a fragmentary sectional view illustrating a positional relationship between blades and a stator core.
Figure 11:
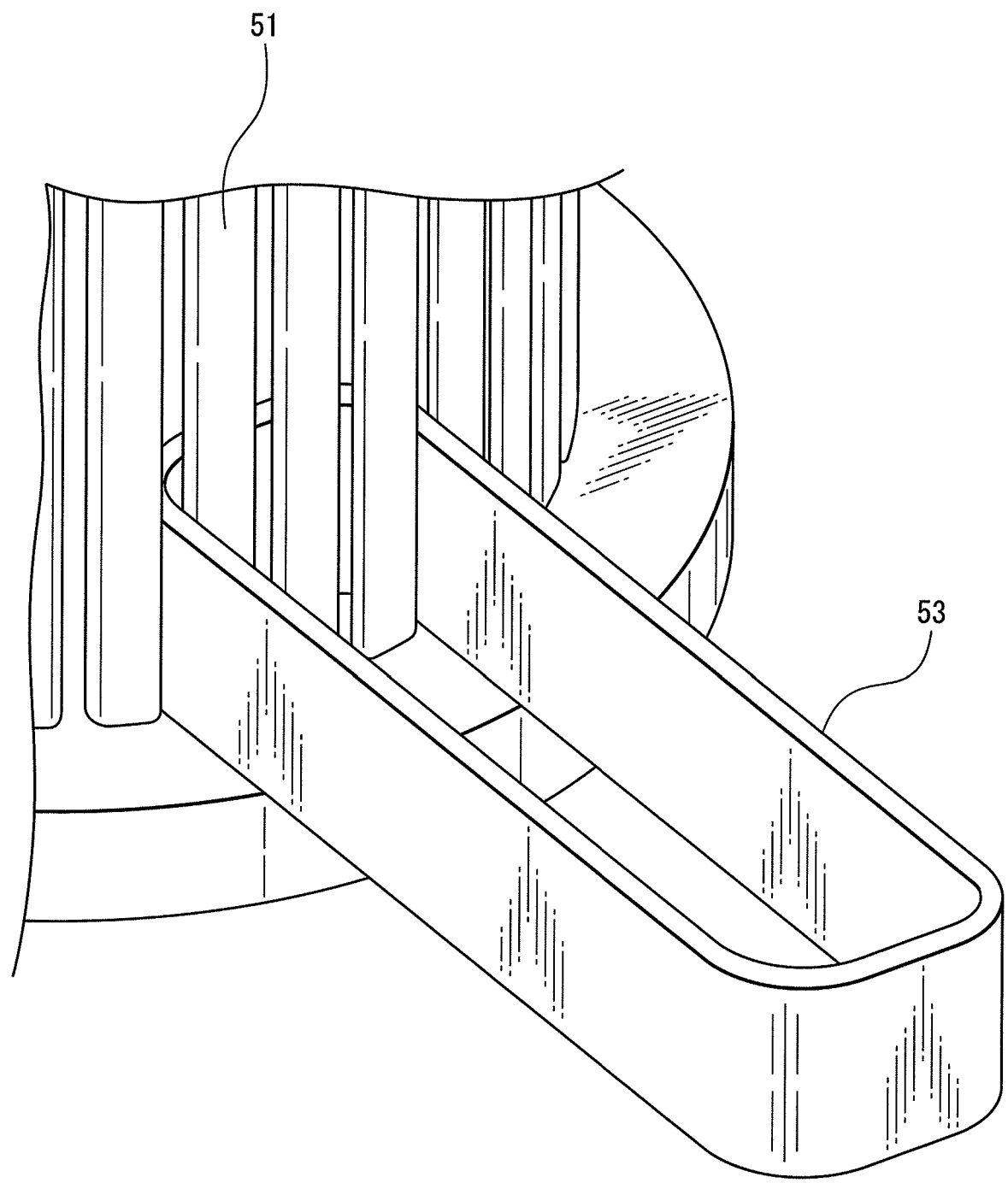
FIG. 11 is a view (part one) illustrating a conventionally used distributed winding method for a radial gap-type motor.
Figure 12:
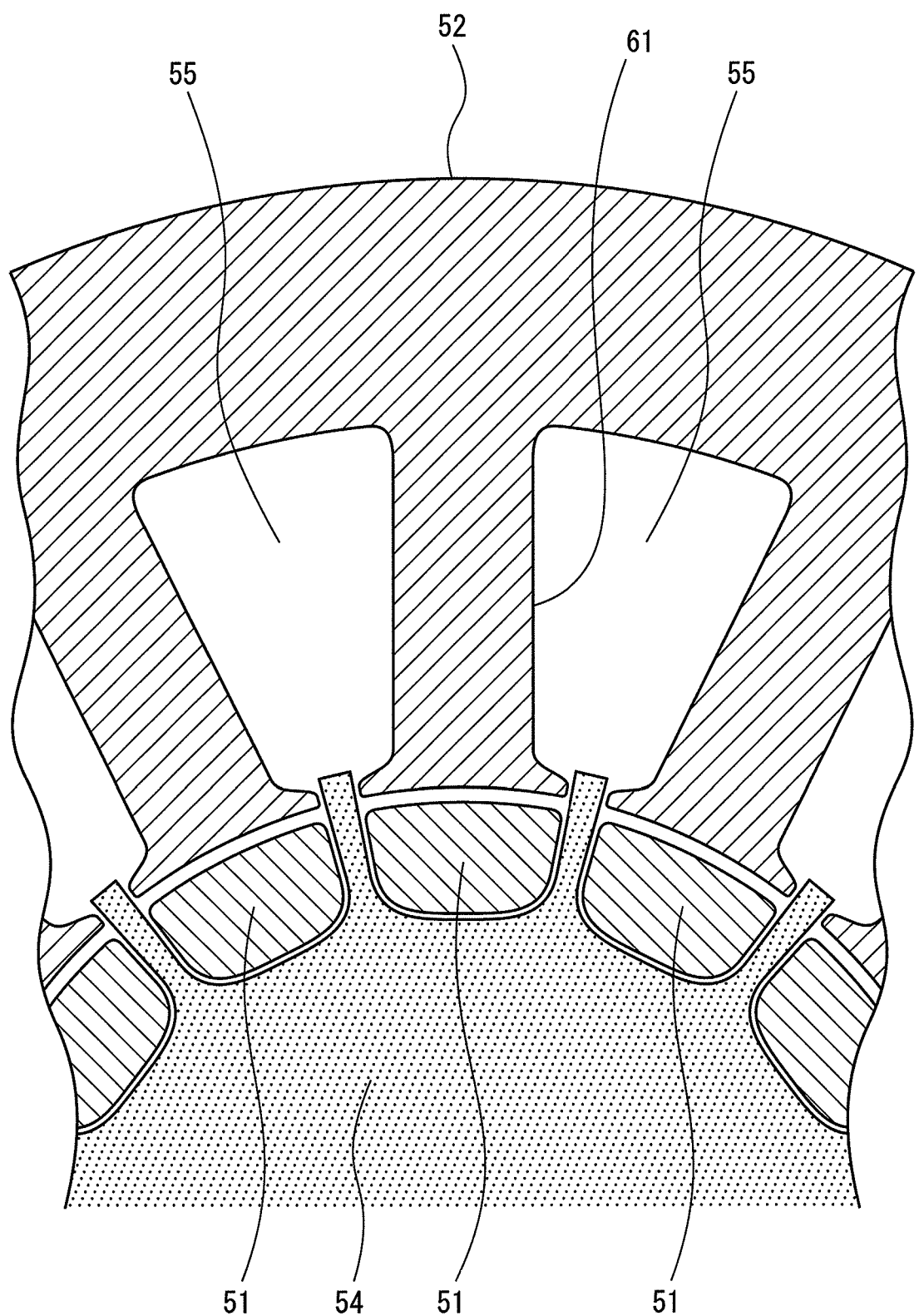
FIG. 12 is a view (part two) illustrating a conventionally used distributed winding method for a radial gap-type motor.
Figure 13:
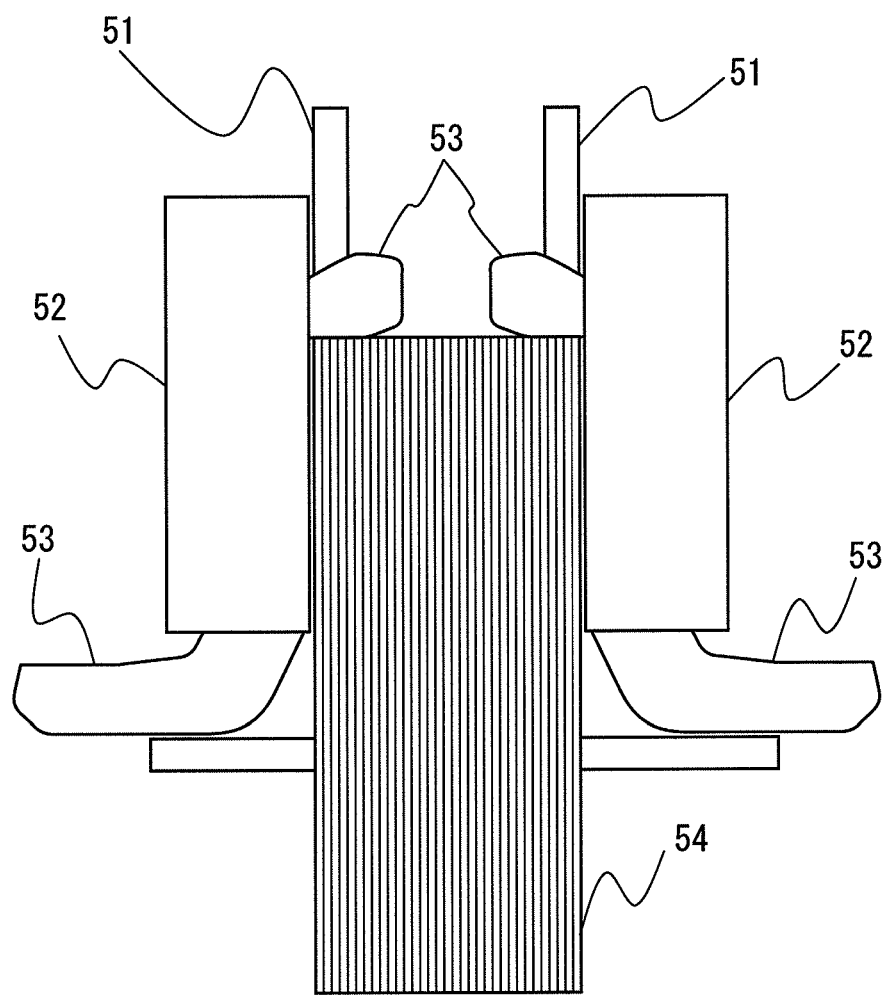
FIG. 13 is a view (part three) illustrating a conventionally used distributed winding method for a radial gap-type motor.
Figure 14:
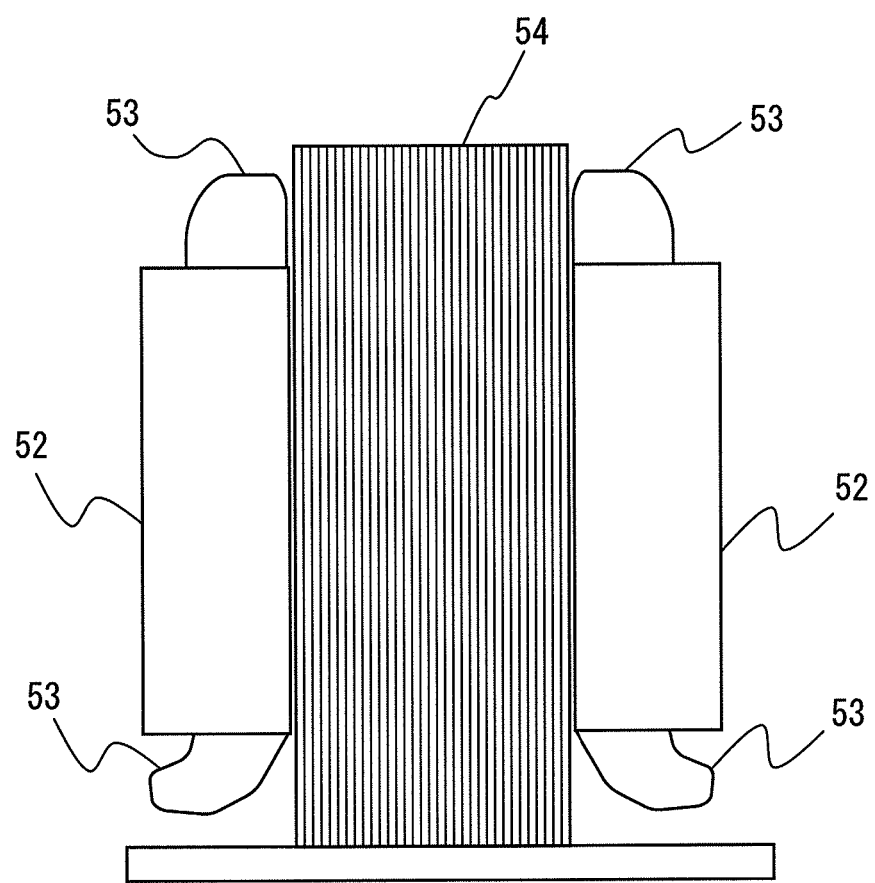
FIG. 14 is a view (part four) illustrating a conventionally used distributed winding method for a radial gap-type motor.

At subsequent step S105, the insulation component 12 formed with the grooves 20 for accommodating lead wires and crossover wires as illustrated in FIG. 8 is arranged in the vicinity of coil ends where the lead wires and the neutral points are arranged. The arrangement of the grooves 20 illustrated in FIG. 8 is by way of example, and it may only be a structure by which the lead wires and the crossover wires are retained such that inter-phase insulation can be achieved. The material, per se, of the insulation component 12 does not limit the present invention in any way, but any common insulating material may be used that is used for inter-phase insulation of a motor.

Then, at step S106, the lead wires and the crossover wires are accommodated in the grooves of the insulation component. In the example illustrated in FIG. 3, the lead wires LU, LV, and LW and the crossover wires CU1, CV1, CW1, CU2, CV2, and CW2 are accommodated in the grooves 20 of the insulation component 12.

In this manner, the 8-pole-pair radial gap-type motor 1 according to the third embodiment of the present invention includes, in addition to the components illustrated in FIGS. 2 and 3, the insulation component 12 formed with grooves 20 in the vicinity of coil ends where the lead wires LU, LV, and LW and the neutral points NU1, NU2, NV1, NV2, NW1, and NW2 are arranged. According to the third embodiment of the present invention, the lead wires LU, LV, and LW and the crossover wires CU1, CV1, CW1, CU2, CV2, and CW2 are accommodated in the grooves 20 of the insulation component 12 so that it is possible to secure inter-phase insulation, while at the same time restraining the coil ends from becoming large. Further, it turns out to be a simple task that "the insulation component 12 formed with the grooves 20 is arranged in the vicinity of the coil ends, and the lead wires LU, LV, and LW and the crossover wires CU1, CV1, CW1, CU2, CV2, and CW2 are accommodated in the grooves 20" after the first coil group and the second coil group are connected in parallel to each other; thus, mechanization and automatic processing by machine are facilitated with respect to not only the processing for forming and inserting the coils in the slots but also the insulation processing.

In the foregoing, by way of example, description has been made of the winding arrangement for a radial gap-type motor with 8 pole-pairs and 36 slots. However, the present invention is not limited to the number of pole pairs being 8 but is applicable to any radial gap-type motor in which the number of pole pairs is integer times of 4. In other words, according to the present invention, even in the case of a radial gap-type motor in which the number of pole pairs is integer times of 4, it may be configured such that for each phase, the odd-numbered coils along the direction of ration are connected via a crossover wire to form a first coil group, and the even-numbered coils along the direction of rotation are connected via a crossover wire to form a second coil group, and for each phase, the first coil group and the second coil group are connected to each other at one end so as to be in parallel-connected relationship with each other; and a current input side lead wire is formed at the connection point, and the first coil group and the second coil group are connected to each other at the other end so that the connection point is defined as a neutral point. The above-described embodiment relating to the insulating component is also applicable to a radial gap-type motor in which the number of pole pairs is integer times of 4. According to the present invention, it is possible to achieve a radial gap-type motor in which a distributed winding arrangement can be achieved which is easily structured with coil ends being prevented from becoming large, and a winding arrangement method for such a motor.

According to the first embodiment of the present invention, it turns out to be a simple task that for each phase, the coils molded for each one pole pair are engaged with the blades as the first and the second coil group in which the coils are connected in series, and the resultant structure is inserted in the stator core; thus, the winding arrangement for distributed winding can be easily achieved so that mechanization and automatic processing by machine are facilitated with respect to the processing for forming and inserting the coils. Further, according to the first embodiment of the present invention, the coils are less likely to cross each other at the coil ends and the winding resistance can be decreased.

Further, according to the second embodiment of the present invention, the insulating material is arranged after the insertion of the first coil group, and then the insertion of the second coil group is carried out, so that the inter-phase insulation can be easily achieved, and mechanization and automatic processing by machine are facilitated with respect to not only the processing for forming and inserting the coils in the slots but also the inter-phase insulation processing. Further, as in the first embodiment, the coils are less likely to cross each other at the coil ends and the winding resistance can be decreased.

Further, according to the third embodiment of the present invention, the insulation component formed with the grooves is arranged in the vicinity of the coil ends where the lead wires and the neutral points are arranged, and the lead wires and the crossover wires are accommodated in the grooves so that it is possible to secure inter-phase insulation, while at the same time restraining the coil ends from becoming large. Further, it turns out to be a simple task that after the first coil group and the second coil group are connected in parallel to each other, the insulation component formed with the grooves is arranged in the vicinity of the coil ends, and the lead wires and the crossover wires are accommodated in the grooves; thus, mechanization and automatic processing by machine are facilitated with respect to not only the processing for forming and inserting the coils in the slots but also the insulation processing.

What is claimed is:

1. A radial gap-type motor in which an n-pole-pair, where n is integral times of 4 three-phase winding wound in a distributed winding form is inserted in slots of a stator, wherein the motor is characterized by comprising:
    a first coil group provided for each of the three phases, the first coil group comprising coils wound for each one pole pair, wherein odd-number-th coils are connected via crossover wires along a direction of rotation;
    a second coil group provided for each phase, the second coil group comprising coils wound for each pole pair, wherein even-number-th coils are connected via crossover wires along a direction of rotation;
    a current input side lead wire provided for each phase and extending from one of a connection point between the first coil group and the second coil group which are connected in parallel to each other;
    a neutral point provided for each phase and being an other one of the connection points between the first coil group and the second coil group which are connected in parallel to each other; and
    slots that accommodate the first coil group and the second coil group, wherein slots accommodate either one of the first coil group and the second coil group entirely in either one of an inner side and an outer side in the radial direction in slots, and accommodate the other one of the first coil group and the second coil group entirely at the other one of an inner side and an outer side in the radial direction in slots.

2. The radial gap-type motor according to claim 1, further comprising insulation components for inter-phase insulation, wherein the insulation components are arranged in a vicinity of the coil ends where the lead wires and the neutral points are arranged and in the slots.

3. The radial gap-type motor according to claim 1, further comprising an insulation component formed with grooves accommodating the lead wires and the crossover wires, wherein the insulation component is arranged in a vicinity of the coil ends where the lead wires and the neutral points are arranged.

* * * * *